United States Patent [19]

Hirakawa

[11] 3,843,826
[45] Oct. 22, 1974

[54] METHOD FOR PRODUCTION OF CASTELLA OR SOFT CAKE

[76] Inventor: Kanehiro Hirakawa, 2-10 Fujigaya 2-chome, Kanagawa, Japan

[22] Filed: June 2, 1972

[21] Appl. No.: 259,267

Related U.S. Application Data

[63] Continuation-in-part of Ser. No. 30,820, April 22, 1970, abandoned.

[52] U.S. Cl. .............................. 426/399, 426/152
[51] Int. Cl. ..................................... B65b 55/100
[58] Field of Search ....... 99/92, 172, 211, 213, 214; 426/399

[56] References Cited
UNITED STATES PATENTS
| | | | |
|---|---|---|---|
| 1,885,142 | 11/1932 | Reece et al. | 99/172 |
| 3,401,043 | 9/1968 | Finley et al. | 99/182 |
| 3,691,013 | 9/1972 | Sakai et al. | 195/47 X |

FOREIGN PATENTS OR APPLICATIONS
| | | | |
|---|---|---|---|
| 451,262 | 4/1970 | Japan | 99/92 |
| 16,362 | 12/1890 | Great Britain | 99/172 |

*Primary Examiner*—Raymond N. Jones
*Attorney, Agent, or Firm*—Toren, McGeady and Stanger

[57] ABSTRACT

In producing castella or soft cake, it is baked in an oven positioned between an operation room and a sterilization room which is sealed from the surrounding atmosphere. After removal from the oven into the sterilization room, the castella is first cut to size, its surface is rapidly dried, and finally the castella is packed and hermetically sealed in synthetic resin containers.

3 Claims, 1 Drawing Figure

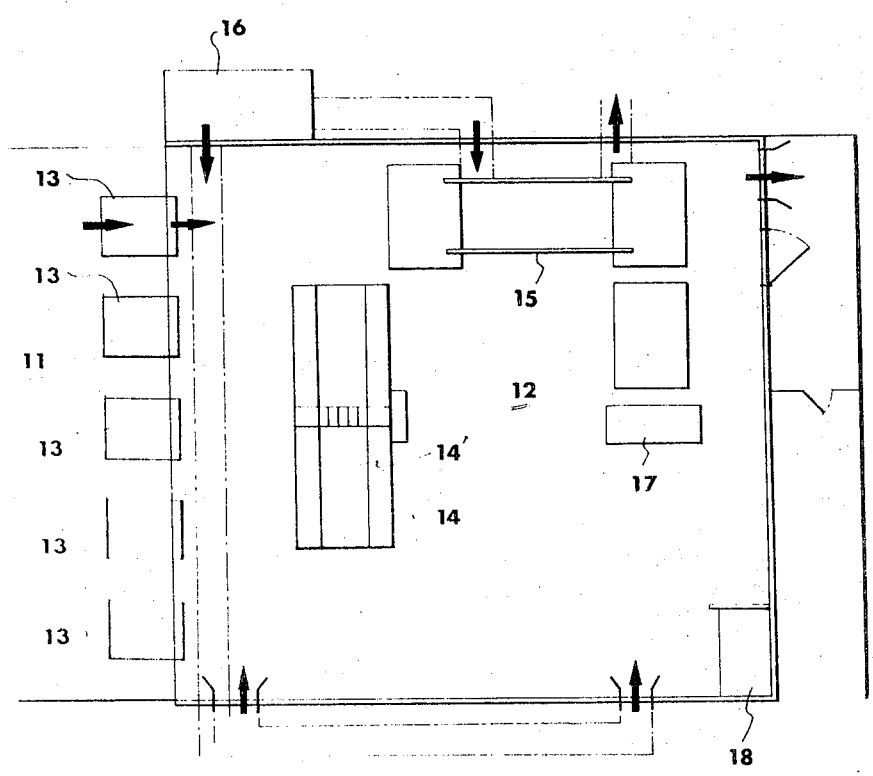

METHOD FOR PRODUCTION OF CASTELLA OR SOFT CAKE

This is a continuation-in-part of my application Ser. No. 30,820 filed Apr. 22, 1970 now abandoned.

SUMMARY OF THE INVENTION

The present invention is directed to the production of castella or soft cake and, more particularly, to a method of processing the castella for rapidly removing moisture from its surface while its interior moisture is unaffected and then packaging it.

Castella is a name given by the Japanese to a bakery product which is similar to sponge cake or angel food cake. It is a Japanese variation of a Spanish cake which was very popular in Castile. Apparently, the cake was introduced into Japan by Portuguese traders or missionaries about 400 years ago and they called it castella bolo, hence the present-day name castella. The Portuguese word for Castile is Castella.

In the present invention castella or soft cake is produced in a sterilization chamber and packed and sealed in a container so that it may be preserved for a long time (2 or 3 months) without losing its flavour and moisture. The present invention relates more specifically to the production of castella in which the cake is baked, sterilized and divided into a desired size in an operation room and in a sterilization room which is completely sealed from the surrounding atmosphere and adjoins the operation room. A plurality of ovens each having a sterilization device is arrayed in a single row along the boundary between the operation and sterilization rooms, the sterilization room has its door closed when the door of the operation room is opened and vice versa. In making the castella it is contacted with a flow of air from an air conditioner for removing any excess water content only from its surfaces. Finally the castella is packed and sealed into an air impermeable, non-toxic, synthetic resin container so that it can be preserved for a long time without growing mold, and losing flavour and moisture.

When not properly protected castella quickly becomes moldy yet it retains the proper moisture content. The moist castella or soft cake is generally produced under sterilized conditions, but it has no inherent flavour immediately after being produced. After being left for 10 to 15 hours, the desired flavour of the castella is produced so that the growing of mold cannot be prevented when the castella is left for a long time. Because of its inherent ingredients, castella or soft cake tends to grow the mold. This tendency is enhanced under the weather and temperature conditions favourable for growing mold. Especially in summer time, the mold grows in about three days. In order to prevent the growing of the mold, in the past a suitable chemical agent or the like was added or the cake was sterilized with heat. However, the castella processed by such conventional methods for protecting it from spoilage and loss of its special character such as flavour, texture, aroma, etc., tends to lose its flavour and aroma.

It is, therefore, the primary object of the present invention to provide a method for the production of castella comprising baking, sterilizing and dividing the cake in a sterilization room without exposing it to the surrounding atmosphere and when the castella is transferred to the sterilization room from an operation room, contacting the castella or soft cake with a flow of air in a tunnel so as to remove the water content only from the surface or skin of the castella or soft cake. Completing the procedure by hermetically sealing the castella in a sterilized container so that it is preserved for a long time without losing its special character such as flavour, aroma, etc., and without the addition of chemicals or effecting heat-treatment.

It is another object of the present invention to provide for the production of castella or soft cake under completely sterilized conditions attained by the combination of a sterilization room and a completely hermetical sealing container, thereby providing the cake having suitable moisture but being unharmed and well protected against spoilage.

It is a further object of the present invention to provide a method for the production of castella in which it is automatically transferred from a sterilization room adjoining a production room through an oven having a sterilization device to an automatic divider, drying only the surface or skin of the castella in a tunnel through which air flows, and hermetically sealing the cake in a completely sterilized container, thereby improving the productivity.

BRIEF DESCRIPTION OF THE DRAWING

The drawing is a single FIGURE which is a block diagram for the explanation of the various devices used for the production of castella or soft cake in accordance with the present invention.

DETAILED DESCRIPTION OF THE INVENTION

The present invention will become more apparent from the following description of one preferred embodiment thereof taken in conjunction with the accompanying drawing.

In the drawing a sterilization chamber 12 adjoins an operation chamber 11 and a plurality of ovens 13 are disposed in one row along the boundary between the operation and sterilization chambers 11 and 12. It should be noted that each of ovens 13 has its own sterilization device.

When the door of the operation chamber 11 is opened, the door of the sterilization chamber 12 is closed and cannot be opened as long as the door of the operation chamber 11 remains opened. Castella baked in the sterilization atmosphere is emptied into the sterilization chamber 12 where it is divided by an automatic divider 14 into the desired size. The divided castella is charged into a wind tunnel 15 wherein the castella is contacted with the air from an air conditioner 16 in which lithium chloride or triethylene glycol is atomized and filtered, so that the castella is sterilized while the excess water content is removed from its surface. Next the castella is sealed into a container, such as a polypropylene container, having no air permeability and no toxicity and the opening is hermetically sealed by a heater or welding machine 17. The polypropylene containers are previously sterilized in an electronic oven or the like at 90° C for 30 seconds before the castella is packed in the polypropylene container.

The sealed castella is discharged out of the sterilization chamber 12 through a discharge opening or gate 18 having a double-shutter device.

The castella thus produced may be preserved for a long time. According to the experiments, no mold grew and flavour was not changed at all even after the castella had been left for 2 or 3 months in a room at room temperature of 25°C.

When the castella is packed and wrapped in such conventional containers as wooden or paperboard boxes for preserving the castella for a long time, the surface of the castella is dried and solidified because of the greater permeability of these packing materials and, as a result, the flavour is lost. In conventional production operations the surface temperature of the castella just discharged out of the oven is generally about 90°C while the temperature at the center thereof is about 150°C so that the castella must be left for 15 to 20 hours so as to cool the temperature before the next step is effected. But in accordance with the present invention, the castella is treated in the wind tunnel for a short time of 15 to 20 minutes in an atmosphere of 15° to 25°C, with a moisture content of 20 to 30 percent and velocity of 10 m/sec. so that water is rapidly removed only from the surface of the castella and the castella is immediately sealed in containers having no air permeability. Therefore, its moisture will not be permitted to leach toward and through the surface of the castella. Thus, the accumulation of the water particles upon the inner surface of the packing container can be completely eliminated.

Next one Example of the present invention will be described.

The castella was discharged from the oven 13 and divided into size by the automatic divider 14 and loaded upon a conveyor 14'. The air from the air conditioner 16 is directed to flow in the direction opposite to that of running of the conveyor 14'. Various data are as follows:

| Dimensions: | 260 mm(L)×100 mm(W)×60 mm(T) |
|---|---|
| Weight: Before drying: | 629 gr. |
| After drying: | 610.5 gr. including a polypropylene container |
| Initial temperature: | 100°C |
| Temperature after treatment: | 15°C |
| Specific heat: | 0.5 |
| Drying air at entrance: | 20 to 25°C |
| | 15% RH (relative humidity) |
| | absolute water content: 0.0016 Kg. |
| Production: | 2,000 kin per day |
| Operating hours: | 8 hours a day |

Formula for obtaining water loss on drying:

$$\alpha W = \alpha A \Delta t / \lambda o$$

where
$\alpha W$ = water loss on drying, Kg/hr
$A$ = surface area
$\lambda o$ = latent heat of water = 590 Kcal/Kg
$\alpha$ = surface thermal conductivity, Kcal/hm²°C
$t$ = difference between the temperatures of the wet- and dry- thermometers, °C
$\alpha = 5.11 \times [(U \times 0.8)/(l \times 0.2)]$
where
$U$ = wind velocity, m/sec.
$l$ = length of the castella in meters Wind tunnel:
750 mm in width and 125 mm in height
Since the first baked castella is produced two hours after the operation is started and the charging of the castella into the wind tunnel is stopped one hour before the operation is stopped, the net operating time of the wind tunnel is 5 hours.

Weight of castella treated per hour in the wind tunnel:

2,000 kin/5 hours = 400 kin
(1 kin=0.6 Kg = 1.3228 lbs)
The castella 5 kins in weight were arrayed upon the conveyor.
The surface area of the castella:
  0.26 (0.1 + 0.06 + 0.06 + 0.1) × 0.06 = 0.0632 m²

The surface areas of the bottom and the side walls or skin of the castella or the trailing walls on the lee of the air flowing through the wind tunnel were not included because the drying of these surfaces was much delayed as compared with other surfaces.

| The air velocity: | 10 m/sec. |
|---|---|
| The surface thermal conductivity: | 42 Kcal/h m²°C |
| The air flow rate: | |
| 0.75 × 0.125 × 10 × 60 | = 56 m³/min. |
| | = 3,360 m³/h. |
| | = 4,050 Kg/hr. |

Water loss on drying:
  0.629 − 0.6105 = 0.0185 Kg/kin
Water evaporation in the wind tunnel:
  400 kin/water lost from castella per hour:
  0.0185 × 400 = 7.4 Kg/hr.
Heat dissipated from castella:
  (100 − 15) × 0.629 × 400 × 0.5 ≈ 10,700 Kcal/hr.

Increase in water content in air:
  7.4/4,050 = 0.0018 Kg/Kg of air
Air temperature rise:

$$10,700/(0.24 \times 4,050) = 11.00°C$$

Air at outlet:
  Drying temperature: 15 + 11.00 = 26.00°C
  water content: 0.0016 + 0.0018 = 0.0034 Kg/Kg
  Temperature of the wet-bulb thermometer: 12.4°C
$\Delta t$:
  at inlet: 15.0 − 5.2 = 9.8°C
  at outlet: 26.0 − 12.4 = 13.6°C
  taking into consideration of a safety factor: 9.8°C
water loss on drying:

$$\alpha W = \alpha A \Delta t / \lambda o$$

$$= (42 \times 0.0632 \times 400 \times 9.8)/590 = 17.6 \text{ Kg/hr.}$$

Drying time:
  Since the water loss on drying per hour is 6.4 Kg/hr.
  7.4/17.6 = 0.42 hr. = 25.2 minutes
  This means that the castella could be dried when passed through the wind tunnel in 200 minutes.
The length of the conveyor belt used for drying:
  equivalent to 30 minutes
  Castellas having a length of 260 mm were spaced apart from each other by 100 mm.
Number of castellas upon the conveyor belt:
  400/2 = 200 kin = 200 pcs.
When arrayed in five columns:
  200/5 = 40
  260 × 40 = 100 × 41 = 14.5 m
Air conditioner:
  Atmosphere: 32°C D.B., 27°C W.B., 68% RH. and 0.0206 Kg/Kg
  Flow rate: 56 m³/min. = 4,050 Kg/hr.

Intake: 11.2 m³/min. on the assumption that 20 percent of the total air was taken from the atmosphere.
Conditioned air: 15°C, D.B., 52°C, W.B., 15% RH and 0.0016 Kg/Kg
Recirculated air: 26°C, D.B., 12.4°C, W.B., 16% RH; and 0.0034 Kg/Kg
Air at inlet of air conditioner:
26°C, D.B.; 15.1°C, W.B.; =% RH, and 0.0065 Kg/Kg The air dehumidified by use of sodium chloride to 20 percent at 10°C. The air thus dehumidified was reheated to 15°C and 15 percent in moisture content and directed to the air conditioner.
Water loss on dehumidifying:
(10.1 − 3.25) × 4,050 = 27,500 Kcal/hr.
Quality of heat for reheating:
(4.5 − 3.25) × 4,050 − 5,062 Kcal/hr.
Water loss on dehumidifying:
(0.0065 − 0.0016 × 4,050 = 19.85 Kg/hr.
Heat from solution regenerator:
The solution absorbed water so that its concentration was reduced. Therefore, the solution was returned to the regenerator, thereby increasing the desired concentration.
Concentration at dehumidifier: 40 percent
Concentration improved by the regenerator: 42 percent

| Water discharged in the regenerator: | 19.85 Kg/hr. |
| --- | --- |
| | BrCl or LiCl |
| 40% aqueous solution: | water 60gr. |
| | 40 gr. |
| Total: | 100 gr. |
| 42% aqueous solution: | |
| water: 58 gr. LiCl: 42 gr. Total 100 gr. | |
| Water: 55 gr. LiCl: 40 gr. Total 95 gr. | |

That is, when an amount of 100 gr. of water was circled through the regenerator, 5 gr. of water was discharged. That is, a water content of 5 percent was lost.
The Flow Rate:
19.85/0.05 = 397 Kg/hr.
The temperature of the solution returned from the regenerator was 80°C.
The temperature of the solution in the dehumidifier was 8°C.
The specific heat of the solution: 0.65
The quantity of heat of the solution returned:
(80 − 8) × 0.65 × 397 = 18,600 Kcal/hr.

Heat of dilution:
26 Kcal/Kg.
26 × 19.85 = 517 Kcal/hr.
Refrigeration load:

| Heat for evaporation of water: | 27,500 Kcal/hr. |
| --- | --- |
| Heat of dilution: | 507 Kcal/hr. |
| Heat from regenerator: | 18,600 Kcal/hr. |
| | 46,617 Kcal/hr. |

Under the above conditions, the castella was dried and packed into the polypropylene containers and sealed by the heat sealing machine. No mold grew in the castella even after 2 or 3 months.

What is claimed is:

1. A method of producing castella or soft cake comprising providing a sterilization chamber sealed from the surrounding atmosphere, baking a unit of castella in a sterilized oven and conveying the hot castella directly from the oven into the sterilization chamber so that it is maintained in a sterile atmosphere, automatically dividing the unit of baked castella into sections of desired size within the sterilization chamber, introducing the divided hot castella into a laterally closed flow path within the sterilization chamber, flowing air through the flow path at a temperature range of 15° − 25°C. with a moisture content in the range of 20 − 30 percent and passing the castella along the flow path for contact with the air for a period of time of 15 − 20 minutes for rapidly removing the moisture from the surface of the castella while retaining the moisture content within the interior of the castella, packing and hermetically sealing the castella in a sterilized container within the sterilization chamber after the completion of its passage through the flow path, and discharging the sealed castella from the sterilization chamber.

2. A method, as set forth in claim 1, characterized therein by sterilizing the castella by introducing a sterilizing agent selected from the group consisting of lithiumchloride and triethyleneglycol into the air being used for removing the moisture from the surface of the castella.

3. A method, as set forth in claim 1, characterized therein that the container is sterilized by electronically heating polypropylene container at 90°C for approximately 30 seconds.

* * * * *